(12) United States Patent
Garcia

(10) Patent No.: US 7,458,104 B1
(45) Date of Patent: Dec. 2, 2008

(54) RAINCOVER APPARATUS FOR PUSHED VEHICLE AND PUSHER

(76) Inventor: Lydia E. Garcia, 393 S. 3rd St., Apartment 5A, Brooklyn, NY (US) 11211

( * ) Notice: Subject to any disclaimer, the term of this patent is extended or adjusted under 35 U.S.C. 154(b) by 0 days.

(21) Appl. No.: 11/741,504

(22) Filed: Apr. 27, 2007

(51) Int. Cl.
*A41D 3/08* (2006.01)
*A41D 3/09* (2006.01)

(52) U.S. Cl. ............... 2/69.5; 2/85; 2/88; 2/214
(58) Field of Classification Search ............ 2/69, 2/69.5, 88, 85, 214, 93, 94, 75, 84, 87, 89, 2/108
See application file for complete search history.

(56) References Cited

U.S. PATENT DOCUMENTS

| | | | | |
|---|---|---|---|---|
| 3,323,136 A | * | 6/1967 | Beck | 2/87 |
| 3,584,315 A | * | 6/1971 | HArdy | 2/89 |
| 3,834,756 A | | 9/1974 | Grell | |
| 4,582,355 A | | 4/1986 | Hall | |
| 5,056,160 A | | 10/1991 | Buchanan | |
| 5,437,061 A | * | 8/1995 | Kenner | 2/69 |
| 5,657,489 A | * | 8/1997 | Ponstein | 2/69 |
| D527,867 S | * | 9/2006 | Chase | D2/826 |

* cited by examiner

*Primary Examiner*—Gloria Hale

(57) ABSTRACT

A raincover apparatus for pushed vehicle and pusher, the apparatus is provided in embodiments to cover a pusher and wheelchair with occupant, stroller with occupant, shopping cart, and the like. The apparatus is provided in vinyl with transparent embodiments, tinted transparent embodiments, and opaque embodiments. The sides of the apparatus provide a venue for advertisement. All sections of the apparatus are joined in smooth transitions, and are preferably seamless. Face openings are provided.

2 Claims, 3 Drawing Sheets

RAINCOVER APPARATUS FOR PUSHED VEHICLE AND PUSHER

BACKGROUND OF THE INVENTION

Various vehicle raincovers for covering strollers and the like are known in the prior art. The devices, however, do not include coverage for the individual pushing the vehicle. A pusher must therefore decline use of pushed vehicles such as strollers, shopping carts, and wheelchairs during inclement weather, or get wet, get cold, or carry an umbrella or some form of coverage, independent of the vehicle. None of these choices is convenient. What is needed is a pushed vehicle cover which protects not only the passenger, but also the pusher.

FIELD OF THE INVENTION

The raincover apparatus for pushed vehicle and pusher relates to raincovers and more especially to a raincover for a pushed vehicle and pusher.

DESCRIPTION OF THE PRIOR ART

U.S. Pat. No. 5,056,160 issued to Buchanan on Oct. 15, 1991 teaches a raincoat for horse and rider. While the device provides protection for more than just the rider, it does not offer protection for an individual and a vehicle, as does the present apparatus. U.S. Pat. No. 3,834,756 issued to Grell on Sep. 10, 1974 teaches a raincover for stroller with canopy. The device does not include an individual pushing the stroller, as does the present apparatus. U.S. Pat. No. 4,582,355 issued to Hall on Apr. 15, 1986 teaches a retractable weather guard for a child stroller or carriage vehicle. The device does not include a pusher for the vehicle.

While the above-described devices fulfill their respective and particular objects and requirements, they do not describe a raincover apparatus for pushed vehicle and pusher that provides for the advantages of the raincover apparatus for pushed vehicle and pusher. In this respect, the raincover apparatus for pushed vehicle and pusher substantially departs from the conventional concepts and designs of the prior art. Therefore, a need exists for an improved raincover apparatus for pushed vehicle and pusher.

SUMMARY OF THE INVENTION

The general purpose of the raincover apparatus for pushed vehicle and pusher, described subsequently in greater detail, is to provide a raincover apparatus for pushed vehicle and pusher which has many novel features that result in an improved raincover apparatus for pushed vehicle and pusher which is not anticipated, rendered obvious, suggested, or even implied by prior art, either alone or in combination thereof.

To attain this, the raincover apparatus for pushed vehicle and pusher comprises a raincover apparatus to fit over both a stroller or other pushed vehicle, and the pusher who propels the vehicle. Pushed vehicles include but are not limited to strollers, shopping carts, wheel chairs, and the like. The apparatus provides rain and other inclement weather shelter that is proportioned to fit both the pusher and the vehicle simultaneously. The preferred embodiment is produced of clear vinyl. Tinted embodiments are offered. The apparatus provides an excellent surface upon which to display logos as well, and therefore doubles as an advertising medium. The apparatus negates the typical need for holding an umbrella while pushing a stroller. Various sizes of the apparatus are provided such that various pushed vehicles and the pusher are accommodated. The highly flexible apparatus is also provided with a pouch for carry of the raincover when not in use.

Thus has been broadly outlined the more important features of the improved raincover apparatus for pushed vehicle and pusher so that the detailed description thereof that follows may be better understood and in order that the present contribution to the art may be better appreciated.

An object of the raincover apparatus for pushed vehicle and pusher is to protect the pusher, vehicle, and potential passenger from inclement weather conditions.

Another object of the raincover apparatus for pushed vehicle and pusher is to smoothly transition from the various sections of the cover, one to the next.

A further object of the raincover apparatus is to provide protection for a pusher and stroller.

An added object of the raincover apparatus for pushed vehicle and pusher is to provide protection for a pusher and wheelchair and passenger.

And, an object of the raincover apparatus for pushed vehicle and pusher is to provide protection for a pusher and a shopping cart.

Still another object of the raincover apparatus for pushed vehicle and pusher is to provide a venue for advertising.

Further, an object of the raincover apparatus for pushed vehicle and pusher is to provide transparent protection.

An object of the raincover apparatus for pushed vehicle and pusher is to provide optional transparent and tinted protection.

These together with additional objects, features and advantages of the improved raincover apparatus for pushed vehicle and pusher will be readily apparent to those of ordinary skill in the art upon reading the following detailed description of presently preferred, but nonetheless illustrative, embodiments of the improved raincover apparatus for pushed vehicle and pusher when taken in conjunction with the accompanying drawings.

In this respect, before explaining the current embodiments of the improved raincover apparatus for pushed vehicle and pusher in detail, it is to be understood that the raincover apparatus for pushed vehicle and pusher is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved raincover apparatus for pushed vehicle and pusher. It is therefore important that the claims be regarded as including such equivalent constructions insofar as they do not depart from the spirit and scope of the raincover apparatus for pushed vehicle and pusher. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the raincover apparatus for pushed vehicle and pusher generally designated by the reference number 10 will be described.

Figure 1:
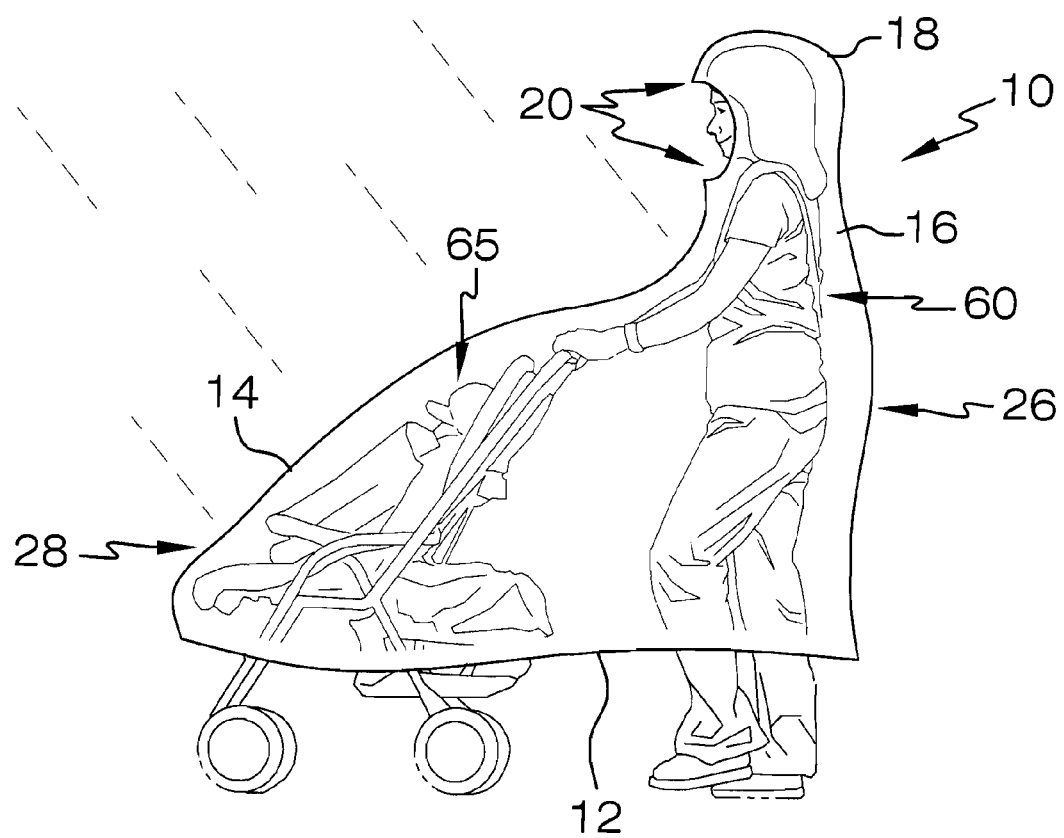
FIG. 1 is a side elevation view of one embodiment of the apparatus, the embodiment for a stroller with child.
Figure 2:
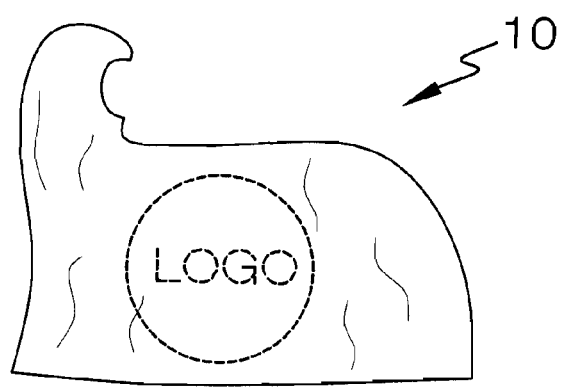
FIG. 2 is a side elevation view of the apparatus of claim 1, depicting the large area available for a logo.
Figure 3:
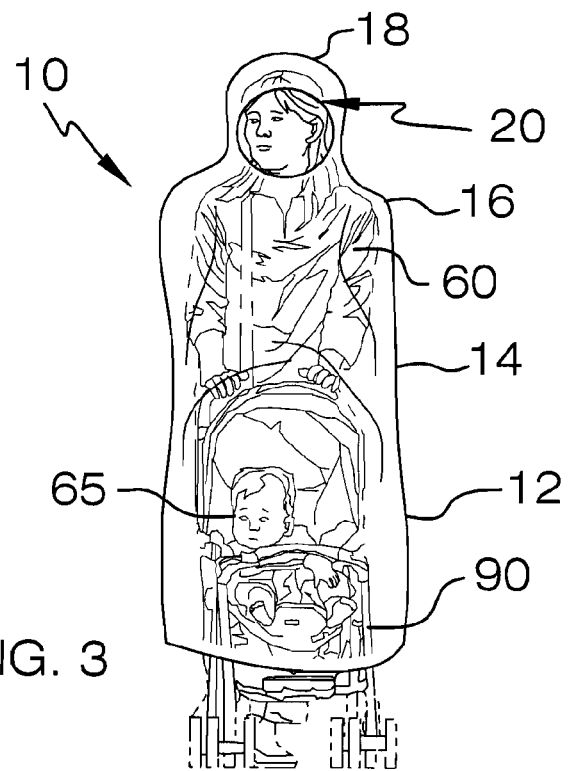
FIG. 3 is a front elevation view of the embodiment of FIG. 1.

Referring to FIGS. 1, 2, and 3, one embodiment of the raincover apparatus 10 is provided for a pushed vehicle which comprises a stroller 90. The pusher 60 propels the stroller 90 in typical fashion. The embodiment of the apparatus 10 comprises a flexible vinyl cover 12. The cover has a front 28 and a rear 26. The cover 12 comprises an elongate body 14.

The body 14 is shaped to cover the stroller 90 and the pusher 60. A vehicle may include a stroller 90, a shopping cart 80, a wheelchair 70, or other vehicle which is propelled primarily or temporarily by a pusher 60. The riser 16 is disposed at the rear 26 of the body 14 of the cover 12. The first hood 18 is disposed on the top of the riser 16. Preferably, the riser 16 is contiguous and seamlessly incorporated into the body 14. Preferably, the first hood 18 is contiguous and seamlessly incorporated into the top of the riser 16. The face opening 20 is disposed in the front of the first hood 18. The riser 16 and the first hood 18 are incorporated within the elongate body 14 and with each other such that all curves of the joined components are gradual and smooth, thereby providing a superior fit to pusher 60, vehicle, and passenger 65. The sides of the cover 12 body 14 provide a large an excellent venue for logos 30 for either advertising or personal tastes.

Figure 4:
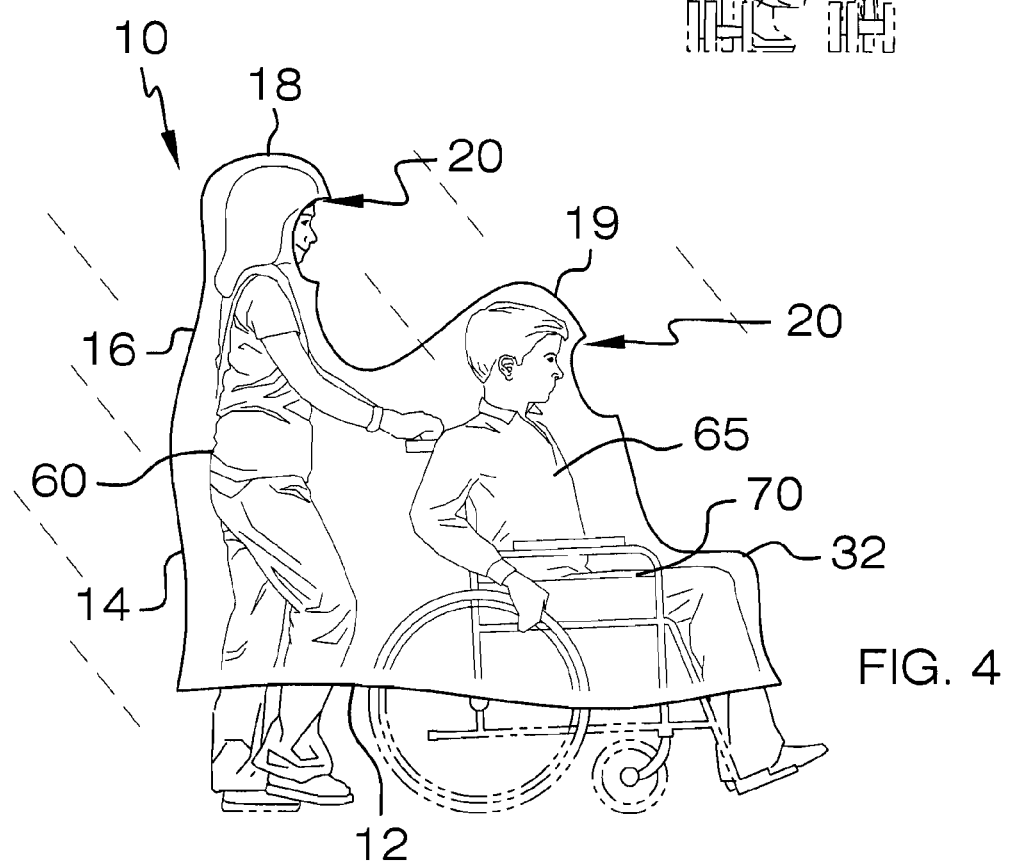
FIG. 4 is a side elevation view of an embodiment of the apparatus for use in pushing a wheelchair with passenger.
Figure 5:
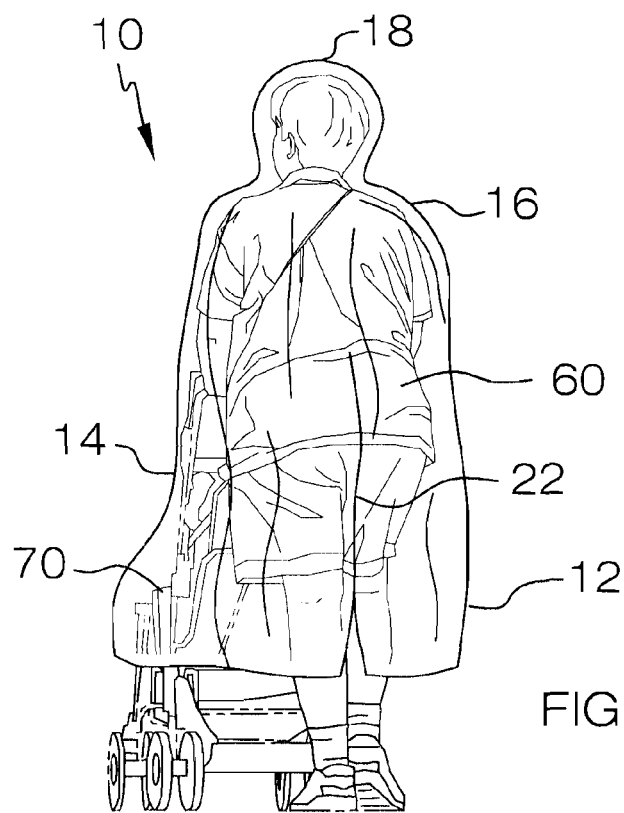
FIG. 5 is a rear perspective view of the embodiment of FIG. 4.

Referring to FIGS. 4 and 5, the embodiment of the apparatus 10 is provided for use with a pusher 60 propelling a wheelchair 70 with passenger 65. The apparatus 10 comprises a flexible vinyl cover 12. The cover 12 has a front 28 and a rear 26. The cover 12 comprises an elongate body 14. The body 14 is shaped to cover the wheelchair 70, the passenger 65, and the pusher 60. The riser 16 is disposed at the rear 26 of the elongate body 14. The first hood 18 is disposed on the top of the riser 16. A face opening 20 is disposed in the front of the first hood 18. The second hood 19 is disposed between the riser 16 and the front 28 of the cover 12. A face opening 20 is disposed in the second hood 19. The face opening 20 in the second hood 19 faces forwardly to match the face opening 20 in the first hood 18.

The knee bulge 32 is incorporated into the embodiment to provide for knees of the passenger 65. Preferably, the riser 16 is contiguous and seamlessly incorporated into the body 14. Preferably, the first hood 18 is contiguous and seamlessly incorporated into the top of the riser 16. The riser 16 and the first hood 18 are incorporated within the elongate body 14 and with each other such that all curves of the joined components are gradual and smooth. Preferably, the second hood 19 is incorporated proximal to the front 28 of the body 14 smoothly, thereby providing a superior fit to pusher 60, vehicle, and passenger 65. The sides of the cover 12 body 14 provide a large an excellent venue for logos 30 for either advertising or personal tastes.

Figure 6:
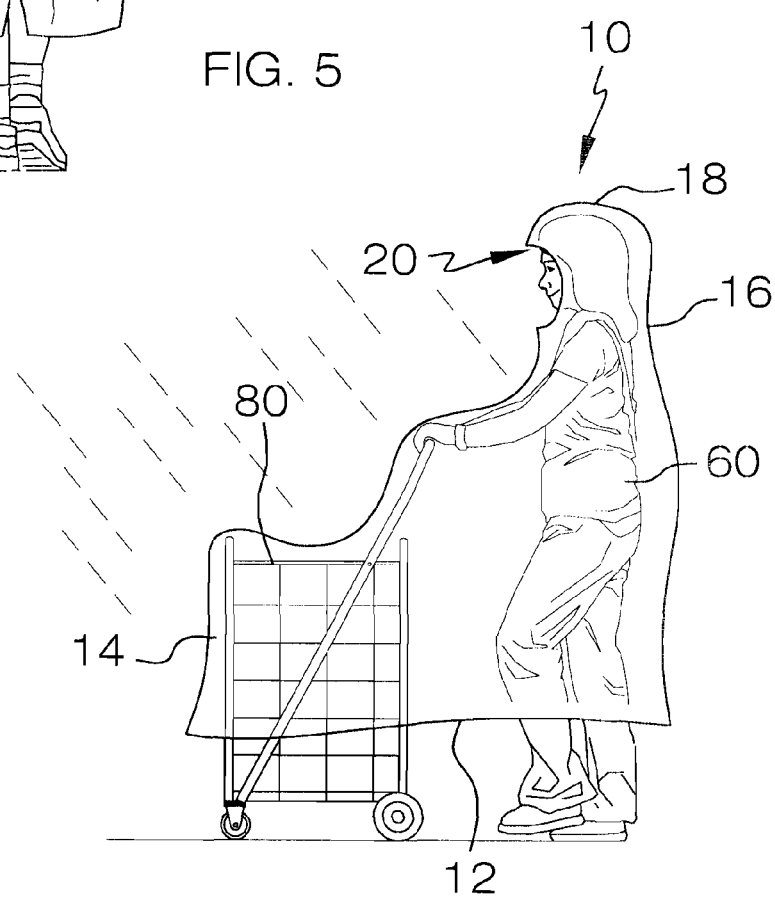
FIG. 6 is a side elevation view of an embodiment of the apparatus used with a shopping cart.

Referring to FIG. 6, the embodiment of the apparatus 10 is provided for a shopping cart 80 and a pusher 60. The apparatus comprises a flexible vinyl cover 12. The cover 12 has a front 28 and a rear 26. The cover 12 comprises an elongate body 14. The body 14 is shaped to cover the shopping cart 80 and the pusher 60. The riser 16 is disposed at the rear 26 of the elongate body 14. The vertical slit 22 is disposed in the rear 26 of the body 14. The slit 22 is disposed below the riser 16. The first hood 18 is disposed on the top of the riser 16. The face opening 20 is disposed in a front of the first hood 18. The elongate body 14 is sufficiently extended from the riser 16 to cover the shopping cart 80. Preferably, the riser 16 is contiguous with the body 14. Preferably, the first hood 18 is contiguous with the riser 16.

All embodiments of the apparatus 10 are provided in transparent vinyl. The apparatus is also provided in non-transparent embodiments. All embodiments of the apparatus 10 preferably provide smoothly melded contours and transitions from the various sections of the cover 12, such as elongate body 14 to riser 16, and riser 16 to first hood 18 and second hood 19, as example.

With respect to the above description then, it is to be realized that the optimum dimensional relationships for the parts of the raincover apparatus for pushed vehicle and pusher, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the raincover apparatus for pushed vehicle and pusher.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the raincover apparatus for pushed vehicle and pusher may be used.

Therefore, the foregoing is considered as illustrative only of the principles of the raincover apparatus for pushed vehicle and pusher. Further, since numerous modifications and changes will readily occur to those skilled in the art, it is not desired to limit the raincover apparatus for pushed vehicle and pusher to the exact construction and operation shown and described, and accordingly, all suitable modifications and equivalents may be resorted to, falling within the scope of the raincover apparatus for pushed vehicle and pusher.

What is claimed is:

1. A raincover apparatus for a pushed stroller, and a pusher positioned behind the stroller, the apparatus comprising:
    a unitary flexible vinyl cover, the cover having a front and a rear, the cover comprising:
        an elongate body, the body shaped to completely cover the stroller, and the pusher simultaneously;
        a riser at the rear of the body;
        a vertical slit in the rear of the body, the slit below the riser;
        a first hood on a top of the riser;
        a face opening in a front of the first hood;
        wherein the riser is contiguous with the body;
        wherein the first hood is contiguous with the riser; and
        wherein the vinyl is selected from the group consisting of transparent and tinted.

2. A raincover apparatus for a pushed wheelchair, a wheelchair passenger, and a pusher positioned behind the wheelchair, the apparatus comprising:
    a unitary flexible vinyl cover, the cover having a front and a rear, the cover comprising:
        an elongate body, the body shaped to completely cover the wheelchair, the passenger, and the pusher simultaneously;
        a riser at the rear of the body;
        a first hood on a top of the riser;
        a vertical slit in the rear of the body, the slit below the riser;

a face opening in a front of the first hood;
a second hood disposed between the riser and the front of the cover;
a face opening in the second hood;
wherein the riser is contiguous with the body;
wherein the first hood is contiguous with the riser;
wherein the second hood is contiguous with the body; and
wherein the vinyl is selected from the group consisting of transparent and tinted.

* * * * *